Nov. 20, 1945. E. M. GUYER ET AL 2,389,360
DOUBLE GLAZED WINDOW AND METHOD OF MANUFACTURE
Filed April 7, 1942  2 Sheets-Sheet 1
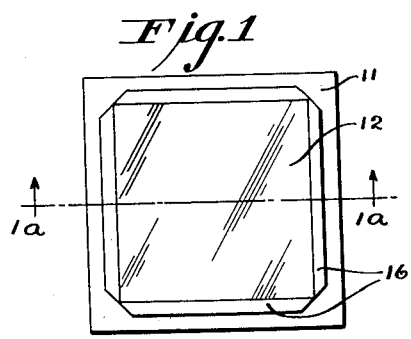
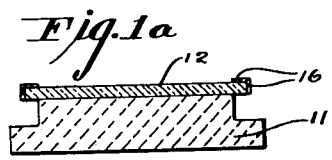
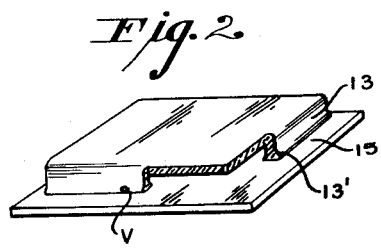
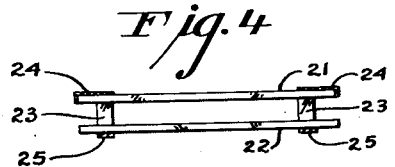
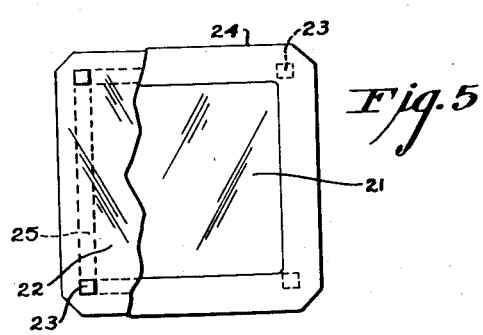
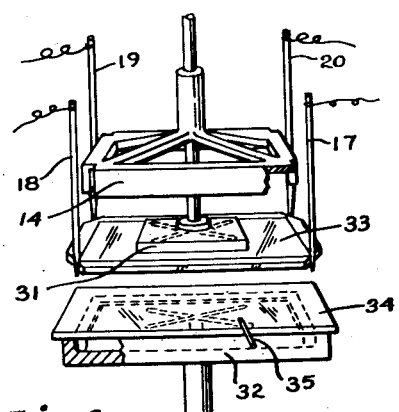
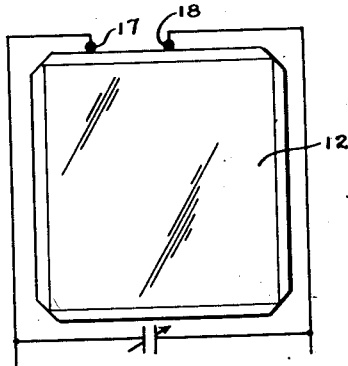
Inventors
EDWIN M. GUYER, JESSE T. LITTLETON
AND MORTON R. SHAW JR.
By F. H. Knight
Attorney Nov. 20, 1945.   E. M. GUYER ET AL   2,389,360
DOUBLE GLAZED WINDOW AND METHOD OF MANUFACTURE
Filed April 7, 1942   2 Sheets-Sheet 2

Inventors
EDWIN M. GUYER, JESSE T. LITTLETON
AND MORTON R. SHAW JR.
By F. H. Knight
Attorney Patented Nov. 20, 1945

2,389,360

UNITED STATES PATENT OFFICE 2,389,360

DOUBLE GLAZED WINDOW AND METHOD OF MANUFACTURE

Edwin M. Guyer, Jesse T. Littleton, and Morton E. Shaw, Jr., Corning, N. Y., assignors to Corning Glass Works, Corning, N. Y., a corporation of New York Application April 7, 1942, Serial No. 438,036

18 Claims. (Cl. 49—82)

The present invention relates to the manufacture of double glazed cells suitable for use as window panes and the like and has for its principal objects novel methods of manufacture suitable for commercial production of such articles.

Fig. 1 is a plan view of a sheet of glass supported on an associated apparatus embodying the invention by means of which the sheet can be reshaped to form one portion of a double glazed unit or cell embodying the invention;

Fig. 1a is a section through Fig. 1 along the line 1a—1a;

Fig. 2 is a perspective view, partly in section, illustrating a completed unit in which the seal has not been pulled and which may be made by following any of several methods embodying the invention;

Fig. 3 is an elevational view of the unit, partly in section, as it appears after the seal is pulled;

Figs. 4 and 5 are elevational and plan views respectively of sheets of glass held in spaced relation by glass spacers prior to the reshaping of one of the sheets to be sealed to the other to form a unit similar to that of Fig. 2 by an alternative method;

Fig. 6 illustrates an apparatus in which two sheets of glass are held in spaced relation by vacuum chucks which enables sealing of the two sheets into a double glazed unit by a slightly different method.

Figs. 7 to 10 illustrate various ways of applying high frequency current to a sheet of glass to effect desired heating thereof;

Figures 8, 9, 10:
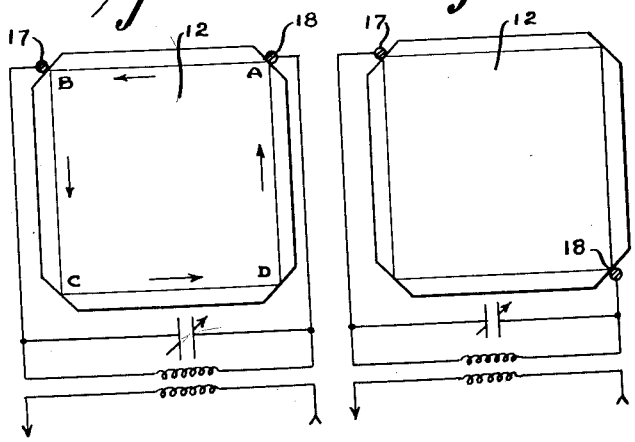

Referring to Figs. 1 and 1a of the drawings, 11 is a form composed of Transite or other refractory material which is not an electrical conductor, for supporting a sheet of glass 12. The sheet of glass 12 is of such dimension that it projects beyond the adjacent bounding edges of form 11 a distance corresponding approximately to the desired distance of space between the opposite surfaces of the double glazed unit. A former 14 (Fig. 6) may be provided to impart a more accurate final shape to sheet 12 as fully brought out hereinafter.

In practicing the invention the marginal edges of sheet 12 are heated in any desired fashion until they sag down over the form 11 to produce a shell or shallow walled container 13 which is then brought into contact with a sheet of glass 15 and sealed thereto. If desired, the former 14 may be lowered over sheet 12 to impart greater uniformity to the shape of container 13 before sealing it to sheet 15. For reasons which will be hereinafter brought out, it is desirable to vent the unit to atmosphere. A vent opening V is accordingly provided. The manner of forming the opening V will be described hereinafter.

A satisfactory way of heating the marginal edges of sheet 12 is to apply a band 16 of conducting material on one side of the sheet along a line in vertical alignment with the outline of the form 11 and heating the glass in the region of the margin of the sheet by passing high frequency current through the conductive coating so that the adjacent glass is heated and becomes conducting before the conductive coating is destroyed and is thereafter heated to plasticity by the current passing therethrough. The conductive coating may be in the form of a narrow band spaced along the line it is desired to effect bending of the sheet as above defined. Applicant prefers however to extend the coating over the edge surface thereof because it has been found that the down turned edges reach a higher temperature and tend to draw up by surface tension into thickened portions $13^1$ as illustrated in Fig. 2 when the conducting band has been so extended. These masses of glass enable production of a seal, as will be brought out later, which can be pulled and a better distribution in the glass forming the seal thus obtained without objectionably reducing the thickness of the glass at the seal, as illustrated in Fig. 3. A conductive coating which has been found satisfactory when both the marginal and edge surfaces are covered comprises an aqueous solution of colloidal graphite which may be conveniently applied by brushing or spraying.

Figure 11:
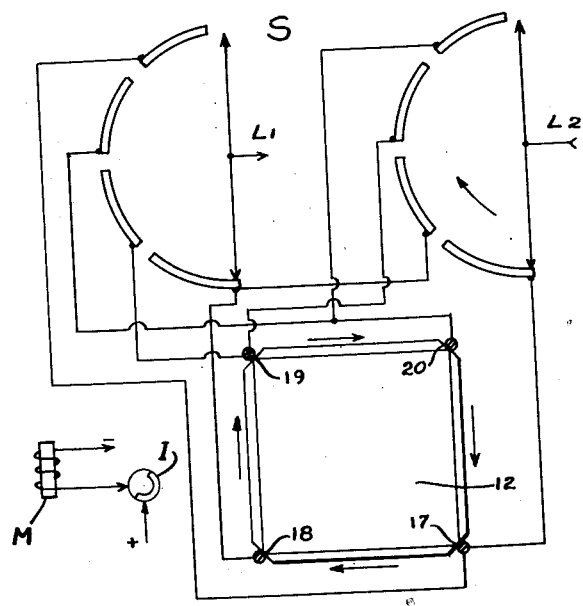
Fig. 11 illustrates a way of applying low frequency current to a sheet of glass to effect desired heating thereof.

Current of suitable characteristics for electrical glass working may be applied in any one of various ways. Any current frequency between and including power and radio is suitable so long as current of suitable potential and magnitude to melt the particular glass composition being worked is provided. A pair of electrodes such as electrodes 17 and 18 (Fig. 7) spaced in accordance with the electrical potential used, may be caused uninterruptedly to scan the margin of sheet 12 until the glass reaches a temperature at which it sags down the desired extent. Alternatively scanning can be in a step by step fashion by successively placing the margins of respective sides of sheet 12 between electrodes 17 and 18. As depicted in Fig. 8, the steps could be from A to B, B to C, C to D, D to A, etc. Another method is to heat all four marginal edges simultaneously by arranging electrodes 17 and 18 as illustrated in Fig. 9, or by use of four electrodes 17–20 as illustrated in Fig. 10. In employing these simultaneous heating methods, however, shifting of the electrodes or specially designed control circuits are sometimes necessary to obtain a proper current distribution. Applicants accordingly prefer to employ four electrodes and to scan the margin of the sheet in step-by-step fashion by switching of the current from one pair of electrodes to another, for example, in the manner diagrammatically illustrated in Fig. 11. In this figure it is assumed a suitable potential is supplied to leads L1 and L2 and is successively impressed on electrodes 17–20 by the switch S operated in step-by-step fashion by inclusion of its operating magnet M in circuit with an interrupter I or other form of pulsing device. The switch S may be of the general type shown in Erickson Patent 1,794,888 granted March 3, 1931.

After gradually and evenly heating the glass by any of the foregoing methods the sagging of the several marginal edges of the sheet will occur concurrently. The shallow cell or container 13 so formed, with or without the use of former 14 as desired, and the upper surface of sheet 15 are brought into contact and fused together by again employing the electrodes 17–20 in substantially the same fashion as when forming container 13. The use of a conducting band 16 on sheet 12 in forming the container 13 and the use of a conductive band applied to sheet 15 for a similar purpose in the sealing operation is desirable in that it localizes the initial heating of the glass strictly to the regions it is desired to bring to fusion temperature until the glass in these regions has been heated to a better conducting temperature. Preferably the conductive coating applied to sheet 15 is on the under side thereof in vertical alignment with the sealing edge of container 13 and of approximately a width corresponding to the sheet thickness. A similar conducting band 25 is shown applied to the underside of sheet 22 (Fig. 4).

A double glazed unit may also be produced in a single stage operation without the use of form 11. This may be done by arranging two sheets of glass 21 and 22 in spaced relation by the use of small glass spacer blocks 23 arranged adjacent the conducting bands 24 and 25 of sheets 21 and 22, following a previously defined method of heating the marginal edges of sheet 21 until they engage sheet 22 and then sealing.

By employing vacuum chucks 31 and 32 (Fig. 6) to hold a pair of glass sheets 33 and 34 in suitable spaced relation, employment of glass spacer blocks 23 can be dispensed with and the double glazed unit otherwise produced in the same fashion as when using spacer blocks. By very slightly separating chucks 31 and 32 as soon as the two parts of the unit are sealed to one another the seal can be pulled. Chucks similar to 31 and 32 can also be employed in conjunction with any of the heretofore described methods to obtain the advantages of the pulled seal.

Having in a rather general way covered a number of methods which may be employed in practicing the invention, the step-by-step procedure which we have found most satisfactory may best be explained by reference to Fig. 6. The sheets of glass 33 and 34 are attached to chucks 31 and 32 in vertical alignment, a Nichrome wire 35 for forming the vent is then arranged on sheet 15 as illustrated in Fig. 6, electrodes 17–20 are brought down alongside and in contact with the corners of sheet 33 and the heating cycle initiated and continued in accordance with the scanning method illustrated in Fig. 11 until the marginal edges of the sheet begin to sag. The current is then cut off, and the former 14 lowered over sheet 33 to form the same into a uniform walled container similar to container 13 (Fig. 2) and the former again withdrawn. While the bottom edges of the container are still plastic the same and sheet 34 are pressed lightly together and then pulled away from each other very slightly to even up any irregularities in the length of the respective side walls. Following this operation, the Nichrome wire 35 is removed and the container allowed to cool down to the temperature of the remainder of the sheet so that when power is applied to complete the seal it will not be wastefully conducted through the walls of the unit. The necessary cycles of power are then applied to complete the seal. The potential applied at this time passes from the electrodes through the plate 34 and through the conducting strip on its under side, corresponding to strip 25 (Fig. 4). The power thus applied at first for the most part passes through the conductive strip, but as the plate 34 and the abutting wall edges become heated by conduction current flow through them and the adjoining wall edges occurs and is continued until the seal is completed. Several cycles before completion of the seal chucks 31 and 32 are separated slightly to pull the seal. Accordingly, if in pulling the seal the marginal portion of plate 34 raises or curls up slightly during the pulling operation, it will be sufficiently plastic to settle back before the glass starts to set up.

As will be readily appreciated the electrodes 17–20 adhere to the glass during the heating cycles, and the manner and time of breaking the electrodes away from the unit will determine the character of the corners of the completed unit. It has been found that if the electrodes are pulled loose from the corners after the initial sealing cycles but before the glass is too hard they will retain electrical connection with the main body of glass through softened and attached links of glass which form between the electrodes and the points from which they are broken, and current for completing the seal will pass through these links. As the sealing operation is being completed the electrodes are moved further away therefrom with the power on. This causes the links to reach a much higher temperature to blow out and the parts thereof attached to the unit to fall back into the soft glass of the unit corner and to be absorbed thereby so that a smooth fire polished corner results.

The alternative form of double glazed unit 40 (Fig. 12) may be made by first producing a cell or container such as 13, placing such container in an inverted position on chuck 32 and proceeding substantially as above described with reference to Fig. 6 to form another container corresponding to 13. The sealing operation of a unit of this design can be effected without use of a conducting band particularly if the scanning method illustrated in Fig. 7 is employed and the electrodes maintained close enough together to restrict the current flow at all times through the glass along the seal line.

Figure 12:
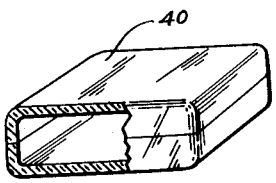
Figs. 12 and 13 are views, partly in section of alternative forms of cells which may be produced in accordance with the methods taught by the present invention.
Figure 13:
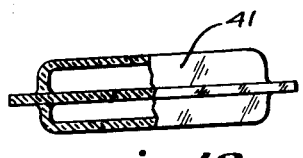

A triple glazed unit such as unit 41 (Fig. 13) can be made in a similar fashion by merely substituting a completed double glazed unit in inverted position in chuck 32 and following the procedure described with reference to Figs. 6 and 12.

Irrespective of which of the foregoing methods is employed it is desirable, in order to prevent excessive breakage by thermal shock, that the sheet of glass employed be preheated to a temperature depending upon the character of glass being used, and that the forming of the upper sheet and the sealing operation be performed in an atmosphere heated to a temperature similar to that of the preheated sheets. The units should also be properly vented immediately when sealed to prevent their collapse due to development of subatmospheric pressure when the seal is pulled and also upon reaching room temperature. In any of the foregoing methods a suitable vent hole can be produced in the manner described with reference to Fig. 6.

Also, irrespective of the method employed in producing the unit, the same should be annealed immediately after the sealing operation has been completed. This may be accomplished by gradually reducing the temperature of the atmosphere in which the seal has been made or in a suitable annealing oven to which the unit may be quickly transferred.

After annealing, the interior of the unit should be purged of any possible moisture and the vent closed. This may be accomplished in any of several ways. For example, the unit may be put into an evacuating chamber and the air evacuated therefrom and followed by introducing dry air into the chamber. Alternatively, a tube may be projected a substantial distance into the unit through its vent and dry air forced therein to drive out any moist air which may be present. A low melting temperature glass of expansion characterics similar to that of the unit may be employed to close the vent or the vent may be closed by use of one of the many available organic plastics. One method is to heat the glass and vinyl acetate to a temperature just below the charring temperature of the acetate and while directing heat toward the vent tamping the softened acetate into the vent.

If desired the vent opening may be produced by using a glass tube instead of a Nichrome wire in which case the exterior surface of the tube wall becomes sealed to the surrounding glass. If desired a Nichrome wire can be placed in the tube during the sealing operation to positively prevent the tube collapsing and becoming closed during such operation and afterwards withdrawn. With a unit tubulated in this fashion closing of the vent can be accomplished by heating and pinching the tube.

A further alternative way of forming and sealing a vent is to employ a tube composed of metal having suitable expansion characteristics for sealing to the surrounding glass and then closing the vent by pinching and welding the exposed end of the tube.

Although in the foregoing there have been described preferred embodiments of the invention, it is to be understood that further variations of practicing the same may be resorted to without departing from the spirit and scope of the invention as claimed.

What is claimed is:

1. The method of producing a double walled glazing unit which includes applying a conducting band over one side of a sheet of glass for a distance inward from its bounding edges depending upon the space to be provided between the oppositely disposed walls of the complete unit, supporting the sheet within the confines of the area bounded by the inner outline of the band, electrically heating the glass in the region of the conducting band by passing a current of electricity through the band and the adjoining glass until the glass along the band softens and sags into a plane normal to the sheet, applying a conductive band on the under surface of a second sheet of glass, so positioning the first sheet that the edges thereof are in contact with the second sheet and in register with the conductive band applied to the underside thereof and electrically heating the glass of the second sheet by passing current through the band and through the adjoining glass of the second sheet to fuse the respective sheets to one another.

2. A method of making a double glazing unit, which includes holding a pair of similar sized glass sheets flatwise in horizontal parallel planes and in spaced relation by engagement of the sheets solely outside the space between them, heating the marginal edges of the uppermost sheet until they sag down a desired distance bridging the gap between the sheets and then sealing the sheets by fusing them to one another.

3. A method of making a double glazing unit which comprises holding a pair of glass sheets flatwise in horizontal parallel planes and in spaced relation and vertical alignment, heating the marginal edges of the uppermost sheet until they sag down toward the lowermost sheet, bringing the sheets into contactual relation, fusing the sheets to one another and immediately thereafter slightly pulling one sheet away from the other to produce better distribution of the glass forming the juncture of the two sheets.

4. A method of making a double glazing unit, which includes holding a pair of glass sheets flatwise in horizontal parallel planes and in spaced relation and substantially vertical alignment, heating the marginal edges of the uppermost sheet until they begin to sag down, subjecting glass in the vicinity of the marginal edges of the uppermost sheet to a shaping treatment to form them into depending walls normal to the surface of the lower sheet, contacting the lowermost edge of the depending wall with the upper surface of the lowermost sheet and effecting fusion of the wall thereto.

5. A method of making a double glazing unit, which includes holding a pair of glass sheets flatwise in horizontal parallel planes and in spaced relation by engagement of the sheets solely outside the space between them, heating the marginal edges of the uppermost sheet until they sag down a desired distance toward the lower sheet, and sealing the sheets by fusing the marginal edges of the sagged sheet to a flat surface of the remaining sheet.

6. The method of bending down a portion of a sheet of glass in a plane normal to the sheet which includes applying a conductive coating on the sheet in the vicinity where the bend is to be made, preheating the sheet in its entirety to a temperature somewhat below that at which the glass becomes plastic, arranging and supporting the sheet flatwise in a horizontal plane by a portion thereof to remain in the horizontal plane, and heating the glass to plasticity along the coating by passing an electrical current therethrough and through the adjacent glass until the glass which has been heated to plasticity sags in a plane normal to the sheet proper.

7. The method of bending down the bounding edges of a sheet of glass which includes supporting the sheet flatwise in a horizontal plane, coating an endless conductive strip or band on one side of the sheet parallel to its bounding edges where the sheet is to be bent and progressively and sequentially applying an electrical potential to sections of the strip between different pairs of electrodes to cause a current to flow therethrough until the bounding edges of the sheet are heated to plasticity and sag in a direction normal to the sheet.

8. The method of heating a band of glass comprising a marginal portion of a sheet, which includes applying a conductive coating to the band to be heated, successively and repeatedly including sections of the band between different pairs of electrodes and supplying the electrodes with an electrical potential of a character suitable for initially heating the glass by passing current through the coating and subsequently through the glass as it reaches a conducting temperature.

9. The method of producing a pane of glass comprising two spaced sheets one of them having a surrounding wall normal to the plane of the first sheet and fused to the surface thereof, which includes applying a conductive band along the peripheral portion of a sheet of glass to become a surrounding wall normal to the plane of the sheet, applying a conductive coating to the underside of the second sheet of approximately the outline of the specified surrounding wall, preheating the sheets to a selected temperature, holding the sheets flatwise in horizontal planes in a heated atmosphere with the first sheet arranged above and in vertical alignment with the second sheet, further heating the coated portion of the first sheet by passing electrical current through sections thereof in succession and successively until the coated portion sags down into a plane normal to the sheet to form the surrounding wall, effecting relative movement of the sheets to engage the surrounding wall of the first sheet with the plane surface of the second sheet opposite the coated surface thereof and passing electrical current through sections of the band covered portion of the second sheet in succession and successively until fusion between the contacting surfaces is effected.

10. The method which includes heating two similar sheets of glass to a desired temperature, placing the sheets flatwise in horizontal parallel planes and in vertically aligned spaced relation, maintaining the sheets heated while heating the marginal portions of the upper sheet until they sag down a desired distance, bringing the lowermost edges of the sagged glass and the upper surface of the lower sheet in contact and fusing them to one another while forming a vent between atmosphere and the interior of the unit so formed, and stretching the glass forming the seal while still plastic.

11. A method of making a double glazing unit, which includes holding a pair of glass sheets flatwise in parallel planes in spaced relation and substantial alignment with one another by engagement of the sheets solely outside the space between them, subjecting glass in the vicinity of the marginal edges of one of the sheets to a shaping treatment, bringing the edges of the latter sheet and a surface of the remaining sheet into contact and effecting their fusion to one another.

12. The method which includes bringing glass heating electrodes into contactual relation with marginal portions of a sheet of glass, applying electrical potential to the electrodes to heat the marginal portions of the sheet until they become plastic and adhere to said electrodes, bending the marginal portions into planes intersecting that of the unheated portion of the sheet, contacting the bent portions with another sheet of glass, fusing said sheet to such portions and thereafter removing the electrodes from contact with the glass while potential is still being applied to the electrodes.

13. The steps of manufacturing a double glazing unit in part from a glass sheet from which corner sections have been removed which include applying a conductive coating to one side of the glass sheet a distance inward from its edges such that the inner borders of the coating barely meet at the edges of the sheet where the corners have been removed, preheating the sheet in its entirety to a temperature somewhat below that at which the glass becomes plastic, supporting the sheet from surfaces within the confines of the coated portions, placing electrodes alongside the edges of the sheet where its corners have been removed, supplying a suitable current of electricity to the electrodes and through the conductive coating to heat the coated portions of the sheet first to a conductive temperature and to thereafter heat such portion to plasticity by the passage of current therethrough and bending the edge portions of the sheet into planes normal to the sheet.

14. The method of producing a double glazing unit which includes preheating two sheets of glass to a temperature well below the softening temperature thereof, placing and holding the sheets flatwise in parallel planes in spaced relation and substantial alignment with one another in an atmosphere maintained at a temperature close to that of the preheated sheets, heating the marginal portions of the uppermost of the sheets to plasticity, reshaping such portions to form a depending wall well within the confines of the boundary of the lower sheet, moving one of the sheets toward the other until the upper surface of the lower sheet and the lower edge of the wall of the remaining sheet contact one another and directing heat into the sheets where they join one another to fuse them together.

15. The method which includes supporting a sheet of glass flatwise from its underside, holding a similar sheet of glass flatwise over and in substantial vertical alignment with the first sheet by the aid of vacuum applied to the upper surface of the upper sheet, heating the outer edge portions of the upper sheet until they sag toward the surface of the lower sheet, forcing the sagging outer portions into planes normal to the sheet thereby transforming the upper sheet into a walled article whose depending edges are free, contacting the free edges of the article wall with a surface of the lower sheet along lines well within the bounding edges thereof and effecting fusion of the glass along the line of juncture of the wall and sheet surfaces.

16. The method of heating a restricted closed path in a glass body which comprises coating the glass along the desired path with a stripe of a combustible conducting material, placing a series of fixed electrodes along said stripe, heating said glass to conducting temperature by burning off said conducting stripe sequentially between said electrodes and heating said glass to a higher temperature by passing electric current sequentially through the sections of heated glass of the stripe between said electrodes.

17. The method of heating a restricted closed path in a glass body which comprises coating the glass along the desired path with a stripe of a combustible conducting material, placing a series of fixed electrodes along said stripe, heating said glass to conducting temperature by burning off said conducting stripe sequentially between said electrodes and heating said glass to a higher temperature by passing electric current sequentially through the sections of heated glass of the stripe between said electrodes and withdrawing said electrodes from contact with said glass and subsequently passing a current between said electrodes to melt any glass adhering thereto.

18. The method of heating the marginal edges of a sheet of glass to a temperature proper for manipulation or fusion by heat generated in the glass itself by its resistance to the flow of an electric current, characterized in that the marginal portions of the sheet are provided with a readily dissipated conductive stripe and current initially fed through sections thereof in succession in such a manner as to dissipate the stripe while bringing the glass adjacent thereto to a suitable conducting temperature and thereafter passing current through sections of the marginal edges of the sheet in succession and successively in such a manner that all marginal edges reach a desired temperature substantially simultaneously.

EDWIN M. GUYER.
JESSE T. LITTLETON.
MORTON R. SHAW, JR.